United States Patent
Strahs

(12) 
(10) Patent No.: US 6,519,246 B1
(45) Date of Patent: Feb. 11, 2003

(54) INTERNET-ENABLED VOICE-RESPONSE SERVICE

(75) Inventor: Lee B. Strahs, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/886,136

(22) Filed: Jun. 30, 1997

(51) Int. Cl.$^7$ .............................................. H04L 12/66
(52) U.S. Cl. ....................................................... 370/352
(58) Field of Search ........................ 370/259, 352–356, 370/410, 522, 252, 353, 525, 526; 379/220, 220.01, 221.01; 707/10

(56) References Cited

U.S. PATENT DOCUMENTS

| | | | |
|---|---|---|---|
| 5,487,103 A | | 1/1996 | Richardson, Jr. et al. |
| 5,530,740 A | | 6/1996 | Irribarren et al. |
| 5,604,737 A | * | 2/1997 | Iwami et al. ............... 370/352 |
| 5,608,786 A | * | 3/1997 | Gordon ...................... 379/100 |
| 5,679,077 A | * | 10/1997 | Pocock et al. ................ 463/19 |
| 5,751,706 A | * | 5/1998 | Land et al. .................. 370/352 |
| 5,799,063 A | * | 8/1998 | Krane ...................... 379/88.04 |
| 5,838,682 A | * | 11/1998 | Dekelbaum et al. ........ 370/401 |
| 5,884,032 A | * | 3/1999 | Bateman et al. ............ 709/204 |
| 5,884,262 A | * | 3/1999 | Wise et al. .................. 704/270 |
| 5,884,312 A | * | 3/1999 | Dustan et al. ................ 707/10 |
| 5,905,476 A | * | 5/1999 | McLaughlin et al. .......... 704/2 |
| 5,912,952 A | * | 6/1999 | Brendzel ................. 379/93.25 |
| 5,999,525 A | * | 12/1999 | Krishnaswamy et al. ... 370/352 |
| 6,195,357 B1 | * | 2/2001 | Polcyn ........................ 370/354 |

FOREIGN PATENT DOCUMENTS

| | | |
|---|---|---|
| CA | 2178705 | 6/1996 |
| EP | 0 782 318 A2 | 7/1997 |
| GB | 2 301 260 | 11/1996 |
| WO | WO 96/34341 | 10/1996 |
| WO | WO 98/13974 | 4/1998 |

OTHER PUBLICATIONS

Walker, B: "Paving the Way for a Paperless Empire," Network Week, GB, APT Data Services, London, vol. 1, No. 42, Jul. 10, 1996; pp. 29–30, XP000618808.

* cited by examiner

Primary Examiner—Chau Nguyen
Assistant Examiner—Jasper Kwoh

(57) ABSTRACT

A method and system of providing a remote user with access to a voice response unit, which allows Internet users to access voice response units using a web graphical interface. In one aspect, the present invention includes an Internet telephone services node, which includes a web server communicatively coupled to a client computer system of the remote user, a voice switch initiating a call to a voice response unit, responsive to a signal from the web server, a touch-tone generator generating a touch-tone signal, responsive to a signal from the web server, and transmitting the touch-tone signal to the voice response unit through the voice switch and an audio streaming server receiving an audio signal from the voice response unit through the voice switch, digitizing the audio signal and transmitting the digitized audio signal to the client computer system through the web server. In another aspect, in order to provide a remote user with access to a voice response unit, the Internet telephone services node receives a request for access to the voice response unit from the remote user. Communications with the voice response unit are established. An audio signal is received from the voice response unit and information to be displayed to the remote user, which corresponds to the received audio message, is transmitted to the remote user.

17 Claims, 4 Drawing Sheets

INTERNET-ENABLED VOICE-RESPONSE SERVICE

FIELD OF THE INVENTION

The present invention relates to accessing a voice response unit through an Internet web server.

BACKGROUND OF THE INVENTION

The Internet has become an increasing popular medium of communication. One popular Internet application is the World Wide Web, which allows users to access servers using a graphical interface. Web access is available using commonly available personal computer hardware and a web browser application.

Another Internet application that is growing in popularity is Internet telephony. There are a number of Internet telephony devices and emerging services that allow a user with a personal computer, which has been properly configured with additional hardware and software, to access other like-equipped personal computers and, through gateways, telephones. Typically, these devices use analog-to-digital speech conversion with packetizing to create a duplex voice-band communication channel. Many of these paths cannot transport touch-tone control signals, such as are used to control voice response units. Other arrangements are not convenient to use, as they require complicated audio input set-ups to work properly.

Voice response units require callers to enter touch-tone control signals to navigate audio menu selections and obtain information or perform functions. Internet users desiring to access voice response units over the Internet are unable to conveniently do so. Internet telephony devices either are inconvenient to use, require complicated additional hardware, or don't work at all. The web graphical interface cannot be used because current web servers have not been interfaced with voice response units. It would be useful to provide the capability for Internet users to access voice response units.

SUMMARY OF THE INVENTION

The present invention is a method and system of providing a remote user with access to a voice response unit, which allows Internet users to access voice response units using a web graphical interface. Popular personal computer hardware configurations may be -used, without the need to add additional hardware.

In one aspect, the present invention includes an Internet telephone services node, which includes a web server, a voice switch, a touch tone generator and an audio streaming server. The web server is communicatively coupled to a client computer system of the remote user. The voice switch initiates a call to a voice response unit in response to a signal from the web server. The touch-tone generator generates a touch-tone signal in response to a signal from the web server, and transmits the touch-tone signal to the voice response unit through the voice switch. The audio streaming server receives an audio signal from the voice response unit through the voice switch, digitizes the audio signal and transmits the digitized audio signal to the client computer system.

In another aspect, in order to provide a remote user with access to a voice response unit, the Internet telephone services node receives a request for access to the voice response unit from the remote user. Communications with the voice response unit are established. An audio signal is received from the voice response unit and information to be displayed to the remote user, which corresponds to the received audio message, is transmitted to the remote user.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
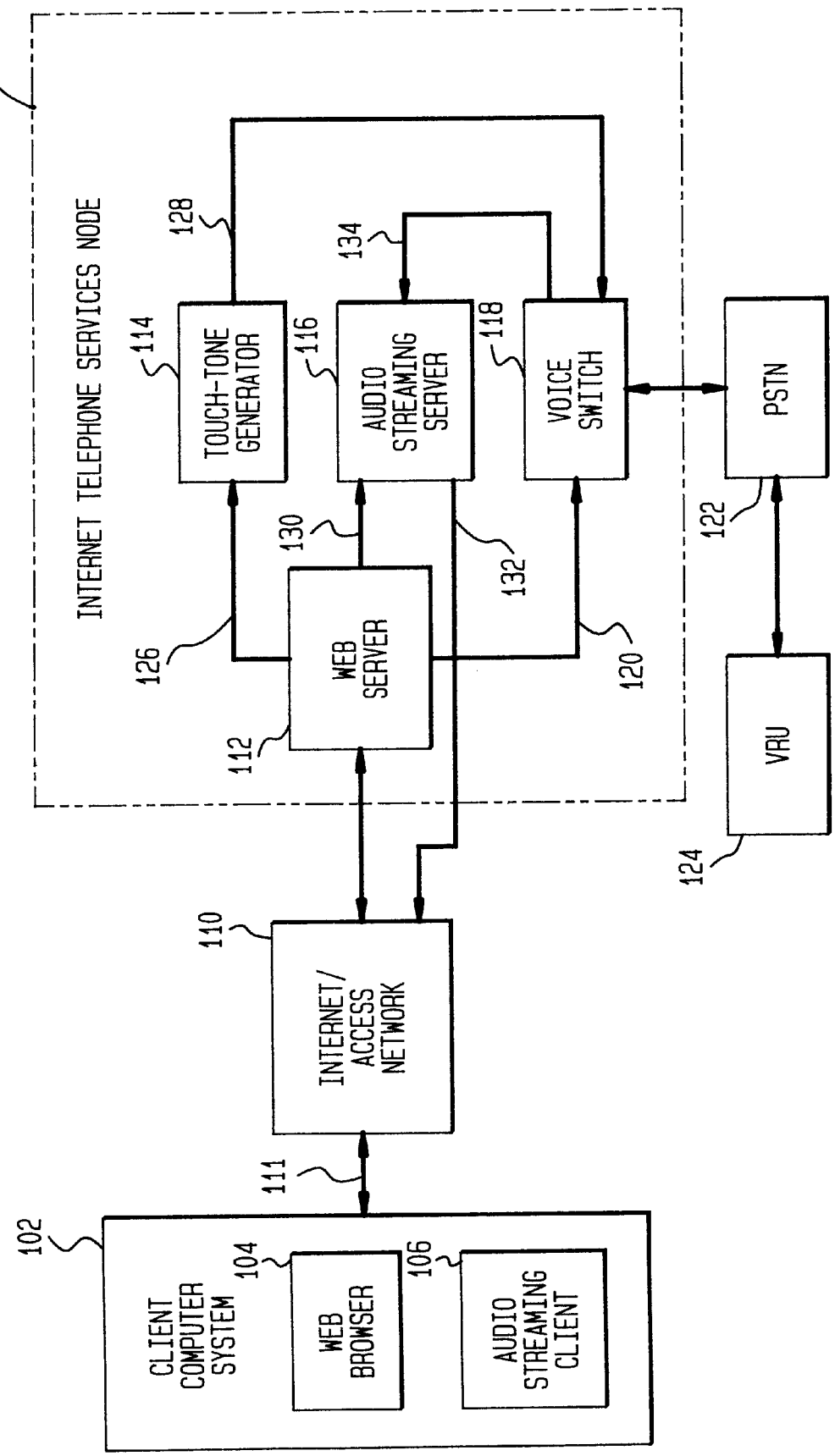
FIG. 1 is a block diagram of an Internet-based voice response unit (VRU) access system, according to the present invention.

An Internet telephone services node, according to the present invention, is shown in FIG. 1. A user operates client computer system 102 to access the Internet. Client computer system 102 is typically a commonly-available personal computer including conventional elements, such as a processor, memory, disk drive, display, and communication adapter, etc. Computer 102 includes a conventional world wide web browser software program 104, such as NETSCAPE NAVIGATOR® or MICROSOFT INTERNET EXPLORER®. Computer 102 also includes an audio streaming client software program 106, which is typically implemented as a plug-in module, a JAVA™ applet, or as a helper application to web browser 104. Audio streaming client 106 receives streaming audio data and plays the audio to the user.

Computer 102 communicates with Internet telephone services node 108 over Internet/access network 110. Computer 102 is coupled to Internet/access network 110 by communication link 111. Typically, computer 102 uses a conventional modem to dial into network 110, in which embodiment communication link 111 comprises conventional telephone lines. However, other types of communication links may also be used, with the appropriate adapters, such as an integrated services digital network (ISDN), or a local or wide area network.

Internet/access network 110 includes a data communications network operated by an Internet service provider of the client and, in some embodiments, may include portions of the Internet. In one embodiment, Internet telephone services node 108 may be directly connected to the Internet service provider network. In another embodiment, Internet telephone services node 108 is connected to the Internet service provider network through the Internet, either directly, or through another Internet service provider network. The details of such communication network connections are well-known.

Internet telephone services node 108 includes web server 112, touch-tone generator 114, audio streaming server 116 and voice switch 118. Internet/access network 110 communicatively couples computer system 102 to web server 112 and to audio streaming server 116, receives requests for information from computer 102 and transmits the requested information to computer 102.

Voice switch 118 is connected to web server 112 by control link 120 and to public switched telephone network (PSTN) 122. Web server 112 issues control signals to voice switch 118, causing voice switch 118 to initiate calls to the target voice response unit (VRU) 124 through PSTN 122. Touch-tone generator 114 is connected to web server 112 by control link 126 and to voice switch 118 by audio link 128.

Web server 112 issues control signals to touch-tone generator 114, causing touch-tone generator 114 to generate touch-tones for controlling VRU 124. The generated touch-tones are transmitted from touch-tone generator 114 to VRU 124 via audio link 128, voice switch 118 and PSTN 122. Audio streaming server 116 is connected to web server 112 by control link 130 and data link 132 and to voice switch 118 by audio link 134. The audio signal generated by VRU 124 is transmitted to audio streaming server 116 via PSTN 122, voice switch 118 and audio link 134. Typically, the VRU audio signal includes audio prompts and messages, but all audio generated by the VRU is transmitted to audio streaming server 116. Audio streaming server 116 digitizes the incoming audio and transmits the digital audio stream to audio streaming client 106 for playback to the user. The digital audio stream is transmitted via data link 132 to Internet/access network 110, then via communication link 111 to computer system 102. As described above, communication link 111 is typically an analog link transmitting data using modems.

Figure 2:
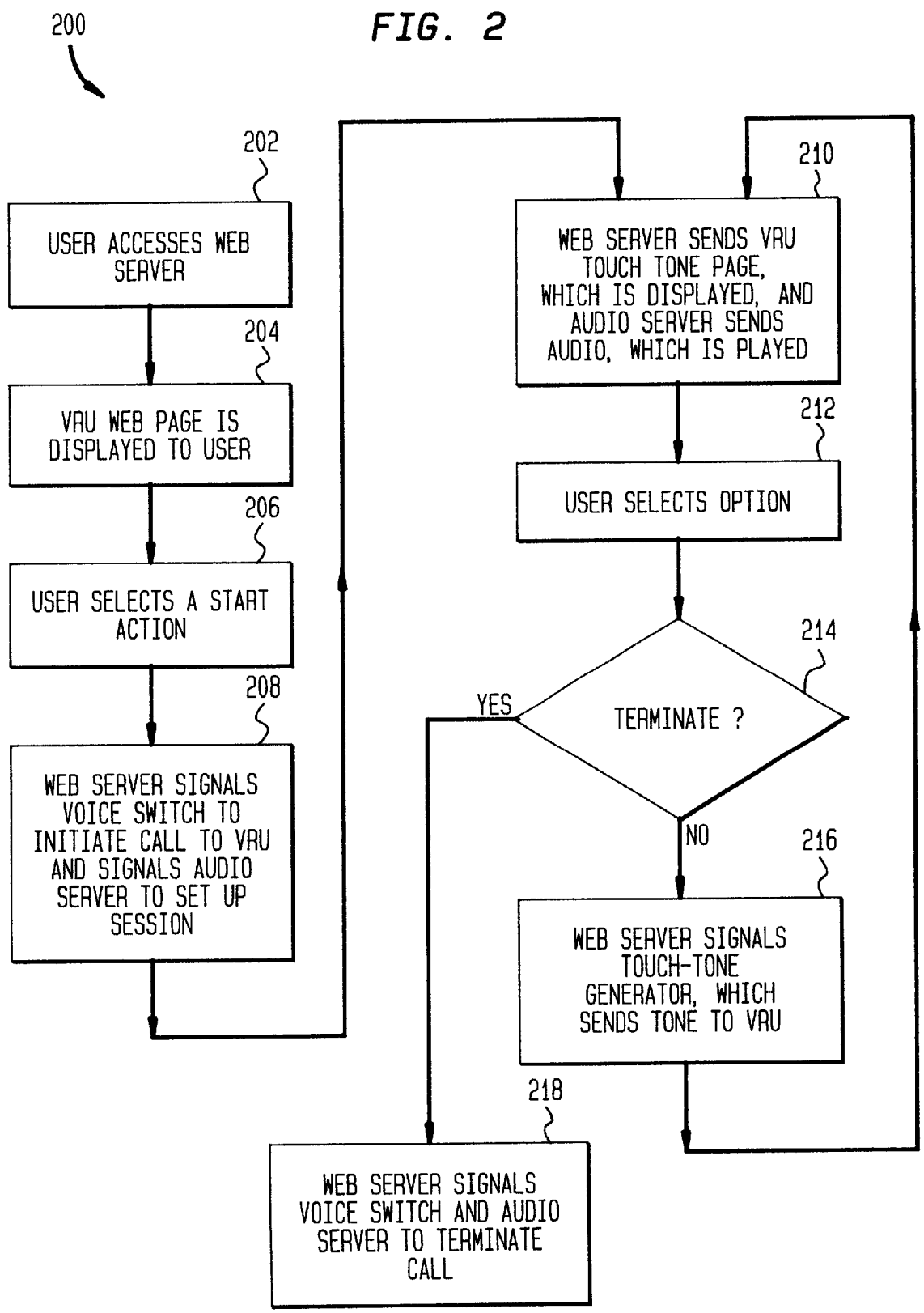
FIG. 2 is a flow diagram of a process for accessing a VRU, implemented in the system shown in FIG. 1.
Figure 3:
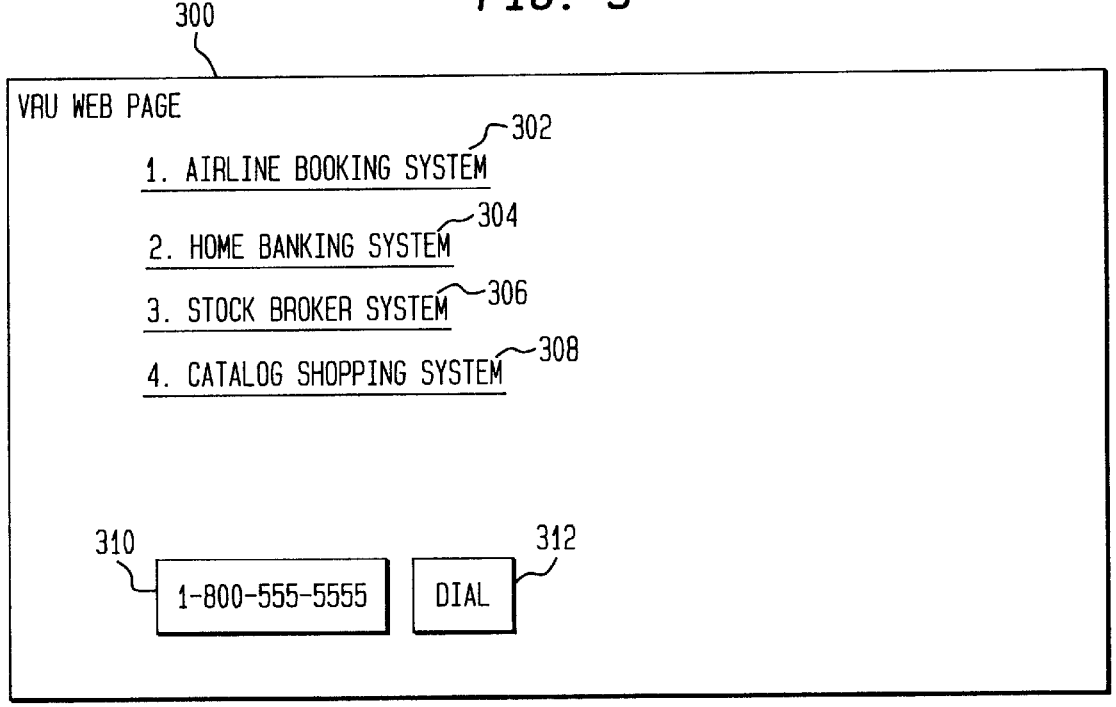
FIG. 3 is an exemplary VRU web page, used by the process shown in FIG. 2.

A process 200 for accessing a target voice response unit using Internet telephone services node 108 of FIG. 1 is shown in FIG. 2. The process is best understood with reference to FIG. 1. The process begins with step 202, in which a user accesses web server 112. Typically, the user does this by running web browser 104 on client computer system 102 and connecting to web server 112 via Internet/access network 110. The user operates web browser 104 conventionally, by selecting pages to be displayed. A request for a selected page is transmitted to web server 112, which then transmits the requested page to web browser 104, which displays the page to the user. When the user selects the VRU web page to be displayed, then in step 204, web server 112 transmits the VRU web page to web browser 104, which displays the VRU web page to the user. An exemplary VRU web page is shown in FIG. 3.

In step 206, the user selects a start action from among the options displayed on the VRU web page. Typically, the VRU web page will list a plurality of supported VRUs that the user may access. When the user selects a particular VRU to be accessed, a request for a start action is transmitted to web server 104, which, in step 208, initiates a session with the selected VRU. Web server 104 signals voice switch 118 to initiate a call to the selected VRU using PSTN 122. Web server 104 also signals audio streaming server to set up a session with the selected VRU. At the completion of this step, a conventional two-way voice call has been established using PSTN 122 between voice switch 118 and VRU 124. Touch-tone generator 114 is connected, through voice switch 118, to the outgoing channel of the call and audio streaming server 116 is connected, through voice switch 118, to the incoming channel of the call. This arrangement allows tones generated by touch-tone generator 114 to be transmitted to VRU 124 and also allows audio prompts and messages from VRU 124 to be transmitted to audio streaming server 116, which digitizes the audio for transmission to client computer system 102.

Figure 4:
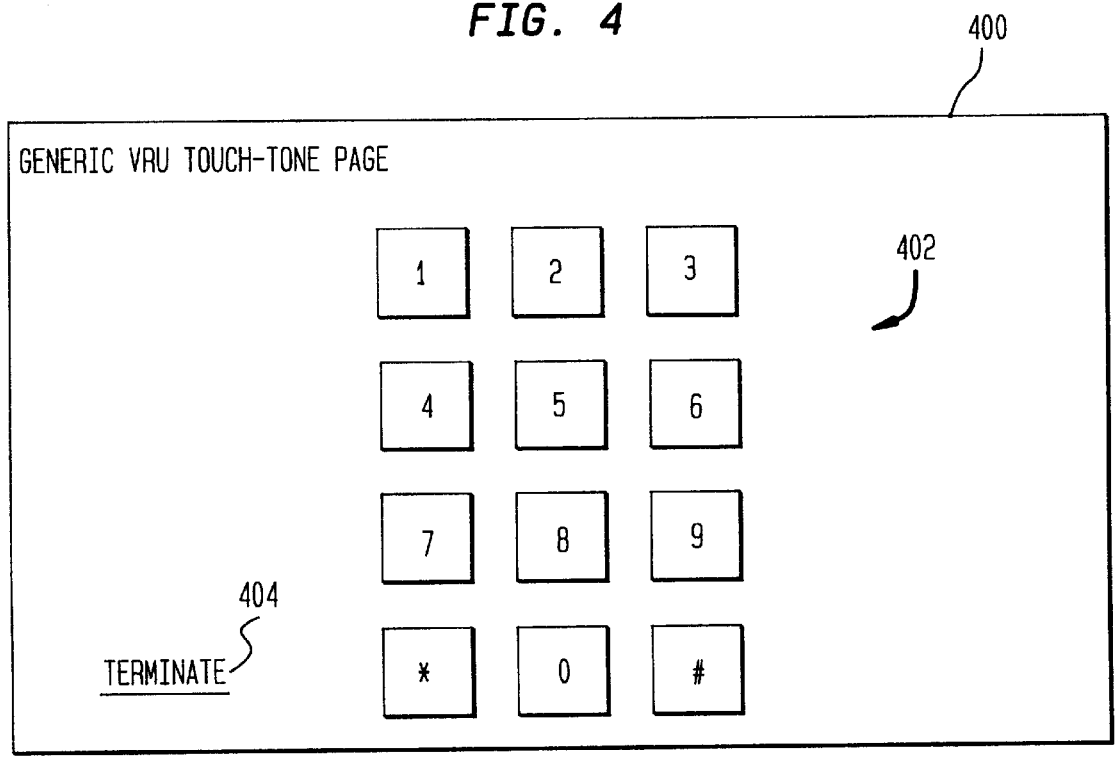
FIG. 4 is an example of one embodiment of a VRU touch-tone page, used by the process shown in FIG. 2.
Figure 5:
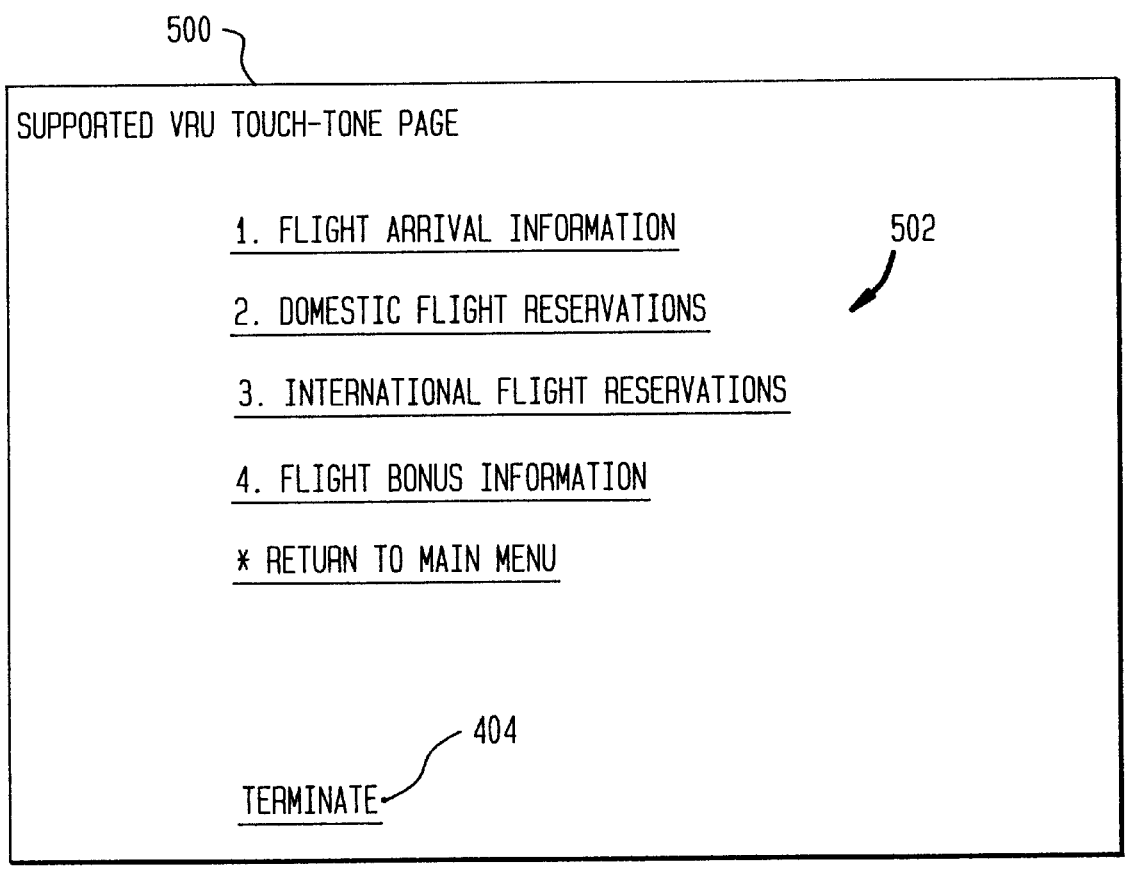
FIG. 5 is an example of another embodiment of a VRU touch-tone page, used by the process shown in FIG. 2.

In step 210, web server 112 sends a VRU touch-tone page to web browser 104, which displays the page to the user. Exemplary VRU touch-tone pages are shown in FIGS. 4 and 5. Audio streaming server 116 sends the audio prompts and messages from VRU 124 to audio streaming client 106 in computer system 102, which plays the audio prompts and messages to the user. In step 212, the user selects an option from among those presented. The selection is sent to web server 112, which, in step 214, determines whether the user selected termination of the VRU session. If the user did not select termination of the session, then in step 216, web server 112 signals touch-tone generator 114 to generate the appropriate touch-tone signals corresponding to the user-selected option. The generated touch-tones are transmitted to VRU 124 using voice switch 118 and PSTN 122. The process then loops back to step 210, in which another VRU touch-tone page, corresponding to the selected next-level menu, is sent to web browser 104 and the corresponding audio is sent to audio streaming client 106.

In step 214, if it is determined that the user selected termination of the VRU session, then in step 218, web server 112 signals voice switch 118 and audio streaming server 116 to terminate the call to VRU 124.

An exemplary VRU web page 300 is shown in FIG. 3. Page 300 displays a plurality of options 302–308, from which a user may select. Each option represents a particular supported VRU system which may be accessed. For a supported VRU system, pages representing the menu structure of the system have been stored in web server 112. The actual option values are presented to the user, as shown in FIG. 5. In this example, option 1 302 represents an airline ticket booking VRU system, option 2 304 represents a home banking VRU system, option 3 306 represents a stock broker VRU system, and option 4 308 represents a catalog shopping VRU system. Selection of an option by the user causes the Internet telephone service node to establish a session with the selected VRU system.

VRU web page 300 also includes a telephone number field 310 and dial button 312, which allow the user to access unsupported VRU systems. When the user enters the telephone number of the VRU system in field 310 and selects dial button 312, the Internet telephone service node establishes a session using the entered telephone number.

When an unsupported VRU is accessed, generic VRU touch-tone page 400, shown in FIG. 5, is displayed to the user. Page 400 includes a plurality of buttons 402 representing the keys on a touch-tone pad. Selection of a particular button causes web server 112 to signal touch-tone generator 114 to generate the corresponding tone. Page 400 also includes a terminate option 404, which allows the user to terminate the VRU session.

When a supported VRU is accessed, a VRU web page that is specific to the accessed VRU is displayed to the user. An exemplary supported VRU touch-tone page 500 is shown in FIG. 5. A plurality of entries 502 are displayed. Each entry represents a particular optional selection of a VRU menu. For each option, the touch-tone key symbol and descriptive text are displayed. The options may be displayed by other representations, such as graphical symbols, pictures, text and combinations thereof. Page 500 also includes a terminate option 504, which allows the user to terminate the VRU session.

Although a specific embodiment of the present invention has been described, it will be understood by those of skill in the art that there are other embodiments that are equivalent to the described embodiment. Accordingly, it is to be understood that the invention is not to be limited by the specific illustrated embodiment, but only by the scope of the appended claims.

What is claimed is:

1. A method of providing a remote user with access to a voice response unit, comprising the steps of:
   accepting access from the remote user;
   transmitting to the remote user, via a data network, information to be displayed, the information representing a plurality of voice response units that may be selected;
   receiving from the remote user, via the data network, a first selection indicating a selected one of the plurality of voice response units;
   establishing audio communications with the selected voice response unit, via a telephone network;
   receiving from the selected voice response unit, via the telephone network, an audio message indicating a plurality of options that may be selected;
   transmitting to the remote user, via the data network, information corresponding to the received audio message;
   receiving from the remote user, via the data network, a second selection indicating a selected one of the plurality of options; and
   transmitting to the selected voice response unit, via the telephone network, an audio signal based on the selected option.

2. The method of claim 1, wherein the access from the remote user is over the Internet.

3. The method of claim 1, wherein the audio communications are carried over the public switched telephone network.

4. A method of providing a remote user with access to a voice response unit, comprising the steps of:
   establishing communications with an Internet telephone services node;
   receiving, from the Internet telephone services node, a first unit of information representing a plurality of voice response units that may be selected;
   displaying, to the user, the first unit of information,
   receiving, from the user, a first selection indicating one of the plurality of voice response units;
   transmitting the first selection to the Internet telephone services node;
   establishing audio communications with the selected voice response unit;
   receiving, from the selected voice response unit, a second unit of information corresponding to an audio message, the audio message indicating a plurality of options that may be selected;
   displaying the second unit of information to the user,
   receiving, from the user, a second selection indicating a selected one of the plurality of options; and
   transmitting the second selection to the Internet telephone services node.

5. The method of claim 4, wherein communications with the Internet telephone services node are carried over the Internet.

6. The method of claim 4, wherein the second unit of information comprises the audio message from the selected voice response unit, and the method further comprises the step of:
   playing the audio message to the user.

7. The method of claim 4, wherein the second unit of information comprises a digitized audio message based on the audio message from the selected voice response unit, and the method further comprises the steps of:
   converting the digitized audio message to analog form; and
   playing the audio message to the user.

8. A system for providing a remote user having a client computer system with access to a voice response unit, comprising:
   a web server communicatively coupled to the client computer system;
   a voice switch configured to initiate a call to a voice response unit, responsive to a signal from the web server;
   a touch-tone generator configured to generate a touch-tone signal, responsive to a signal from the web server, and transmit the touch-tone signal to the voice response unit through the voice switch; and
   an audio streaming server configured to receive an audio signal from the voice response unit through the voice switch, digitize the audio signal and transmit the digitized audio signal to the client computer system.

9. The system of claim 8, wherein:
   the received audio signal indicates a plurality of options that may be selected;
   the web server is further operable to receive a selection indicating one of the plurality of options from the user and transmit a signal based on the selected option to the touch-tone generator; and
   the touch-tone generator is operable to transmit a touch-tone signal based on the selected option to the voice response unit, responsive to the signal from the web server.

10. The system of claim 8, wherein communications with the client computer system are carried over the Internet.

11. The system of claim 8, wherein the communications with the voice response unit are audio communications.

12. The system of claim 11, wherein the audio communications are carried over the public switched telephone network.

13. A system for providing a remote user with access to a voice response unit, comprising:
   means for accepting access from a remote user;
   means for transmitting information to be displayed to the user, the information representing a plurality of voice response units that may be selected;
   means for receiving a first selection indicating a selected one of the plurality of voice response units from the remote user;
   means for establishing audio communications with the selected voice response unit;
   means for receiving an audio message from the selected voice response unit, the audio message indicating a plurality of options that may be selected;
   means for transmitting information corresponding to the received audio message to the remote user;
   means for receiving a second selection indicating a selected one of the plurality of options; and
   means for transmitting an audio signal based on the selected option to the selected voice response unit.

14. A system for providing a remote user with access to a voice response unit, comprising:
   means for establishing communications with an Internet telephone services node;
   means for receiving a first unit of information representing a plurality of voice response units that may be selected from the Internet telephone services node;

means for displaying the first unit of information to the user, means for receiving a first selection indicating one of the plurality of voice response units from the user;

means for transmitting the first selection to the Internet telephone services node;

means for establishing audio communications with the selected voice response unit;

means for receiving a second unit of information corresponding to an audio message from the selected voice response unit, the audio message indicating a plurality of options that may be selected;

means for displaying the second unit of information to the user, means for receiving a second selection indicating a selected one of the plurality of options from the user; and means for transmitting the second selection to the Internet telephone services node.

15. The system of claim 14, wherein communications with the Internet telephone services node are carried over the Internet.

16. The system of claim 14, wherein the second unit of information comprises the audio message from the selected voice response unit, and the system further comprises:

means for playing the audio message to the user.

17. The system of claim 14, wherein the second unit of information comprises a digitized audio message based on the audio message from the selected voice response unit, and the system further comprises:

means for converting the digitized audio message to analog form; and means for playing the audio message to the user.

* * * * *